(12) United States Patent
Yanagisawa et al.

(10) Patent No.: US 7,030,352 B2
(45) Date of Patent: Apr. 18, 2006

(54) OPTICAL SAMPLING MEASUREMENT APPARATUS AND OPTICAL SAMPLING MEASUREMENT METHOD

(75) Inventors: Yoshiki Yanagisawa, Yokohama (JP); Masatoshi Kanzaki, Yokohama (JP)

(73) Assignee: Yokogawa Electric Corporation, Tokyo (JP)

( * ) Notice: Subject to any disclaimer, the term of this patent is extended or adjusted under 35 U.S.C. 154(b) by 171 days.

(21) Appl. No.: 10/458,781

(22) Filed: May 27, 2003

(65) Prior Publication Data
US 2003/0223765 A1 Dec. 4, 2003

(30) Foreign Application Priority Data
May 29, 2002 (JP) .......................... P. 2002-155557

(51) Int. Cl.
*G01J 1/32* (2006.01)

(52) U.S. Cl. ..................................... 250/205

(58) Field of Classification Search ............ 250/214 C, 250/214 A, 205; 398/208, 202
See application file for complete search history.

(56) References Cited
U.S. PATENT DOCUMENTS 5,475,210 A * 12/1995 Taguchi ...................... 250/205
2004/0165894 A1* 8/2004 Taga .......................... 398/202

* cited by examiner

*Primary Examiner*—Thanh X. Luu
*Assistant Examiner*—Tony Ko
(74) *Attorney, Agent, or Firm*—Sughrue Mion, PLLC

(57) ABSTRACT

A light sampling measurement apparatus comprising a nonlinear optical element supplied with a light to be measured and a sampling light and a light receiving element for receiving a light outputted from the nonlinear optical element, includes: a storage unit for previously storing noise generated in the light receiving element; a calculating unit for obtaining a subtracted noise by subtracting the noise stored in the storage unit, from a measured noise, to calculate a Q value of the light to be measured.

5 Claims, 2 Drawing Sheets

OPTICAL SAMPLING MEASUREMENT APPARATUS AND OPTICAL SAMPLING MEASUREMENT METHOD

BACKGROUND OF THE INVENTION

1. Field of the Invention

The present invention relates to an optical sampling measurement apparatus and an optical sampling measurement method of carrying out sampling of a light to be measured, using a nonlinear optical effect to measure a waveform or the like of the light to be measured.

2. Description of the Related Art

Recently, optical communication technology exponentially evolves and a light sampling measurement apparatus actively develops which measures a waveform or the like of optical pulse propagating through an optical fiber for use in an optical transmission path, with evolution of optical communication technology. Proposal is made about a light sampling measurement apparatus which receives the light to be measured and a pulsed sampling light having a (temporally) narrow width, by a nonlinear optical element and which generates a sum frequency light wave in the nonlinear optical element, as a kind of light sampling measurement apparatus. The light sampling measurement apparatus has a light receiving element such as an avalanche photodiode for receiving the generated sum frequency light wave.

Such a light sampling measurement apparatus compares a predetermined threshold level with a reception signal level of the light to be measured, in order to determine existence of signal pulse ("1":mark) or nonexistence of signal pulse ("0":space). It is important to accurately measure a signal to noise ratio (SNR) and a Q value (which will be collectively called Q value hereinafter), on measuring a communication quality and a waveform of light signal (light to be measured) in the optical communication.

Now, it will be assumed that $\mu_1$ represents an average of received signal levels each of which has "1" and $\sigma_1$ represents a variance of received signal levels each of which has "1". Furthermore, it will be assumed that $\mu_0$ represents an average of received signal levels each of which has "0" and $\sigma_0$ represents a variance of received signal levels each of which has "0". Q value is given by a following Equation (1).

$$Q = \frac{\mu_1 - \mu_0}{\sigma_1 + \sigma_0} \quad (1)$$

By the way, it is necessary to accurately measure the average and the variance of signal levels of the light to be measured, as described above, in order to accurately measure the Q value of the light to be measured. However, the variance has noises which are generated in the light sampling measurement apparatus, on measuring the variance of light to be measured. There are a thermal noise and a shot noise each of which is generated in the light receiving element and there is an amplifier noise which is generated in an amplifier for amplifying an photoelectric current outputted from the light receiving element, as the noises generated in the optical sampling measurement apparatus.

More particularly, a power of the light (sum frequency light wave), which is inputted to the light receiving element, becomes very weak, in the optical sampling measurement apparatus using the nonlinear effect. For example, the power of light, which is inputted to the light receiving element, becomes equal to or less than $\frac{1}{1000}$ of the power of light which is inputted to a light receiving element installed in an optical sampling measurement apparatus which does not use the nonlinear optical effect. As a result, the ratio of noise becomes great in comparison to the received light signal which is obtained by receiving the light to be measured. It is difficult to accurately measure the variance of signal levels of the light to be measured. Therefore, it is difficult to accurately measure the Q value of the light to be measured.

SUMMARY OF THE INVENTION

Taking the above-mentioned problems into consideration, it is an object of the present invention to provide a light sampling measurement apparatus and a light sampling measurement method each of which is capable of accurately measuring Q value of a light to be measured, using a nonlinear optical effect.

In order to solve the above-mentioned problems, there is provided a light sampling measurement apparatus comprising a nonlinear optical element supplied with a light to be measured and a sampling light and a light receiving element for receiving a light outputted from the nonlinear optical element, according to the present invention. The light sampling apparatus comprises a storage unit for previously storing noise (information) generated in the light receiving element and a calculating unit for obtaining a subtracted noise by subtracting the noise stored in the storage unit, from a measured noise, to calculate a Q value of the light to be measured.

According to the present invention, the storage unit previously stores the noise which is generated in the light receiving element. On measuring the light to be measured, the noise is obtained by subtracting the light receiving element noise stored in the storage unit, from the measured noise, in order to calculate the Q value of the light to be measured. Accordingly, it is possible to accurately measure the Q value of the light to be measured, even though the inputted light of the light receiving element has a weak intensity on the basis of the nonlinear optical effect and the noise generated in the light receiving element wields a very large influence over the measurement of the light to be measured, inasmuch as the influence of the noise generated in the light receiving element is removed from the measured noise.

In addition, the storage unit stores the noise generated in the light receiving element at each light intensity of the light to be measured, in the light sampling measurement apparatus.

In addition, the storage unit stores the noise generated in the light receiving element at each specific or particular light intensity of the light to be measured and the light sampling measurement apparatus comprises an operating unit for calculating a noise to be subtracted on the basis of the light intensity of the light to be measured, using the noise stored in the storage unit, according to the present invention.

Furthermore, the noise stored in the storage unit is obtained by inputting a continuous light having a known light intensity as the light to be measured, to the nonlinear optical element, according to the light sampling measurement apparatus.

In order to solve the above-mentioned problems, there is provided a light sampling measurement method for supplying a nonlinear optical element with a light to be measured and a sampling light, to receive a light obtained by a nonlinear optical effect, by a light receiving element and thereby to measure the light to be measured, according to the present invention. The light sampling measurement method comprises a noise measuring step of supplying the nonlinear optical element with a continuous light having a known light intensity, to previously measure a noise generated in the light receiving element, a measuring step of measuring at least the noise of light to be measured, and a calculating step of obtaining a noise by subtracting the noise of the light receiving element that is measured in the noise measuring step, from the noise of light to be measured that is measured in the measuring step, to calculate a Q value of the light to be measured.

PREFERRED EMBODIMENT OF THE INVENTION

With reference to drawings, a detailed description will be made as regards a light sampling measurement apparatus and a light sampling measurement method according to a preferred embodiment of the present invention.

Figure 1:
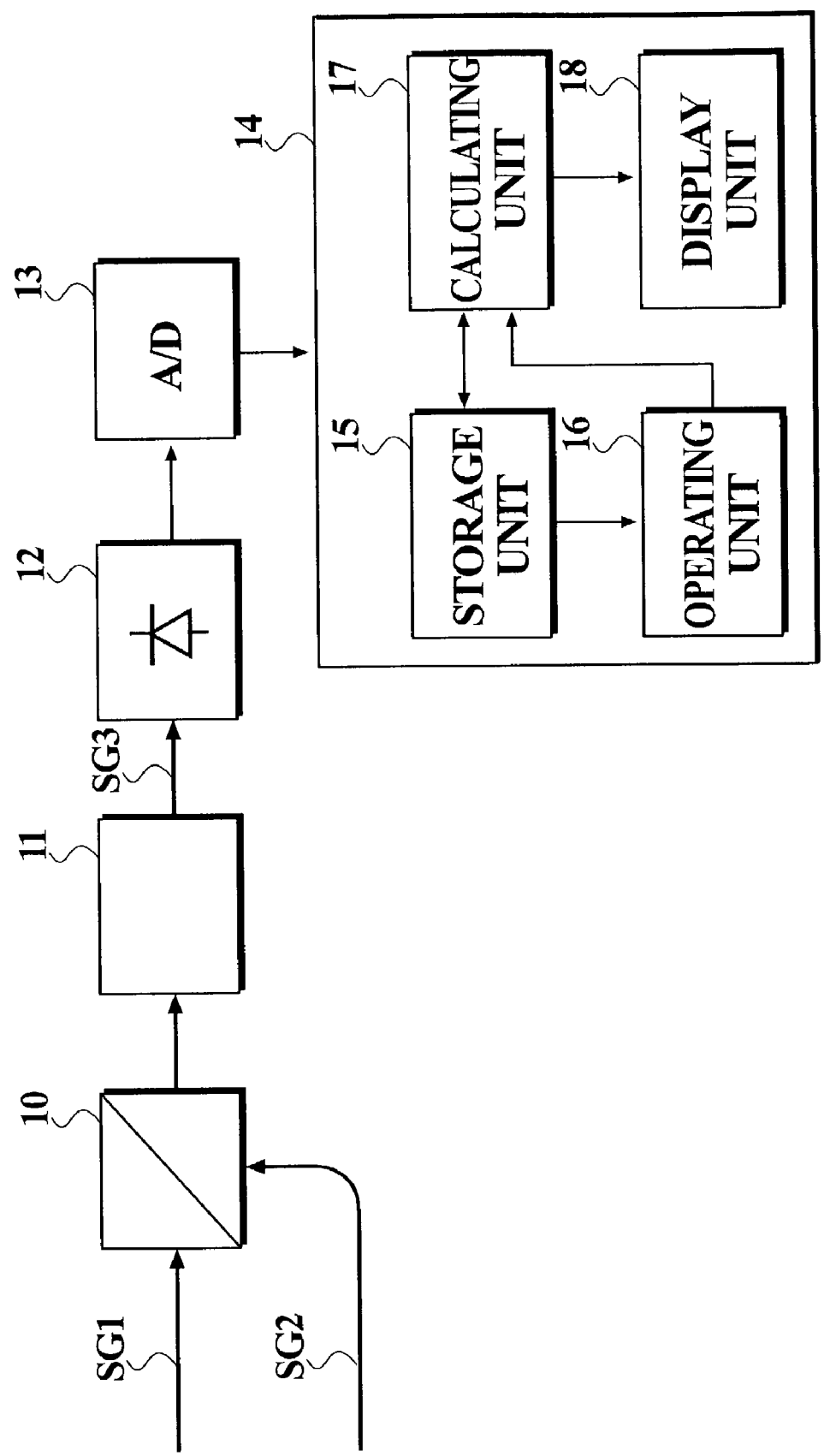
FIG. 1 is a block diagram for illustrating a schematic configuration of a light sampling measurement apparatus according to a preferred embodiment of the present invention.

FIG. 1 is a block diagram for illustrating schematic configuration of a light sampling measurement apparatus according to a preferred embodiment of the present invention. As shown in FIG. 1, the light sampling measurement apparatus according to the preferred embodiment comprises an optical wave multiplexer 10, a nonlinear optical element 11, a light receiving element 12, an A/D converter 13, and a signal processing section 14.

The optical wave multiplexer 10 multiplexes a light SG1 to be measured and a sampling light SG2 to output a multiplexed light. The nonlinear optical element 11 is, for example, phosphoric titanic potassium ($KTiOPO_4$). The nonlinear optical element 11 has an optical axis defined so as to generate a sum frequency light SG3 obtained by the light SG1 to be measured and the sampling light SG2 and is located on an optical path between the optical wave multiplexer 10 and the light receiving element 12.

The light receiving element 12 may be, for example, an avalanche photodiode and carries out a photoelectric conversion with respect to the sum frequency light SG3 which is outputted from the nonlinear optical element 11. Incidentally, it is desired that an optical filter is located between the nonlinear optical element 11 and the light receiving element 12. The optical filter serves to filter out the lights except for the sum frequency light SG3 that are the light SG1 to be measured and the sampling light SG2 each of which passes through the nonlinear optical element 11.

The A/D converter 13 carries out a digital conversion with respect to a photoelectric current which is outputted from the light receiving element 12. It is desired that amplifiers are located between the light receiving element 12 and the A/D converter 13. One of the amplifiers is operable to amplify the photoelectric current which is outputted from the light receiving element 12. Another one of the amplifiers is operable to convert the amplified photoelectric current into a voltage and to amplify the voltage. Furthermore, it is preferable that the amplifiers are capable of automatically switching the gains (ranges) in accordance with light intensity of the inputted light SG1 to be measured. The digital signal outputted from the A/D converter 13 is supplied to the signal processing section 14.

The signal processing section 14 may be, for example, a personal computer and comprises a storage unit 15, a calculating unit 16, an operating unit 16, and a display unit 17. The storage unit 15 is for storing noises which are generated in the light receiving element 12. There are a thermal noise and a shot noise as the noises which are generated in the light receiving element 12. The storage unit 15 continuously stores the noises at each of light intensities of the light SG1 to be measured. Alternatively, the storage unit 15 discretely stores the noises at each of unique or particular light intensities of the light SG1 to be measured.

In case where the storage unit 15 discretely stores the noises of the light receiving element 12 at each of the unique light intensities of the light SG1 to be measured, the calculating unit 16 calculates noises which may be generated in the light receiving element 12, in accordance with the light intensities of the inputted light SG1 to be measured. Namely, the calculating unit 16 calculates noises which should be subtracted, in accordance with the light intensities of the light to be measured. More specifically, the calculating unit 16 reads the noises stored as two light intensities adjacent to the light intensity of the inputted light to be measured, out of the storage unit 15. The calculating unit 16 carries out interpolation with respect to the noises and carries out fitting by using a function of a high order to obtain the noise corresponding to the inputted light SG1 to be measured. Alternatively, the calculating unit 16 carries out interpolation with respect to the noises by using least-squares method, to obtain the noise corresponding to the inputted light SG1 to be measured.

Incidentally, it is necessary for the calculating unit 16 to know the light intensity of the light SG1 to be measured, in case of carrying out the above-mentioned calculation. In case where the calculating unit 16 calculates back the light intensity of the inputted light SG1 to be measured, in accordance with the gain (range) set by an amplifier section which is not illustrated, it is possible for the calculating unit 16 to know an approximate light intensity of the light SG1 to be measured. Alternatively, the calculating unit 16 may be supplied with the light intensity of the light SG1 to be measured that is calculated by the operating unit 17. Furthermore, a user inputs the light intensity of the light SG1 to be measured, into the signal processing section 14, by using an input device which is not illustrated.

The operating unit 17 carries out a digital processing with respect to the signal which is outputted from the A/D converter 13, to calculate a waveform of the light SG1 to be measured. In addition, the operating unit 17 calculates the average $\mu_1$ and the variance $\sigma_1$ of the received signal level having "1" and calculates the average $\mu_0$ and the variance $\sigma_0$ of the received signal level having "0". The operating unit 17 obtains the noise stored in the storage unit 15 on the basis of the calculated variances. The operating unit 15 may subtract the noise calculated by the calculating unit 16, from the noise stored in the storage unit 15, in order to obtain the noise of the light SG1 to be measured from which the noise generated in the optical sampling measurement apparatus is removed. The operating unit 17 calculates the Q value of the light SG1 to be measured in accordance with the above-mentioned average of the signal levels and the calculated noise.

Now, it will be assumed that $\sigma_{system}$ represents the noise generated in the optical sampling measurement apparatus (the noise generated in the light receiving element 12). Furthermore, it will be assumed that $\sigma_{signal}$ represents the variance (noise) of the light SG1 to be measured. There is a relationship given by a following Equation (2), between $\sigma_{system}$ and $\sigma_{signal}$.

$$\sigma_{signal} = \sqrt{\sigma_1^2 - \sigma_{system}^2} \qquad (2)$$

In case where it will be assumed that $\sigma_2$ represents the noise generated in the light receiving element 12 when the signal level is equal to "1" and that $\sigma_3$ represents the noise generated in the light receiving element 12 when the signal level is equal to "0", it is possible to remove the affect of noise which is generated in the optical sampling measurement apparatus, using the above-mentioned Equation (2). It is possible to calculate the Q value of the light SG1 to be measured by a following Equation (3).

$$Q = \frac{\mu_1 - \mu_0}{\sqrt{\sigma_1^2 - \sigma_2^2} + \sqrt{\sigma_0^2 - \sigma_3^2}} \qquad (3)$$

The operating unit 17 calculates the accurate Q value of the light SG1 to be measured, using the above-mentioned Equation (3). The display unit 18 may comprise a displaying device such as a CRT (Cathode Ray Tube), a liquid crystal displaying device, or an organic EL displaying device. The display unit 18 displays the Q value and the waveform of the light SG1 to be measured that are calculated by the operating unit 17.

In the light sampling measurement apparatus having the configuration of the above-mentioned embodiment, measurement is carried out with respect to the noise which is generated in the light sampling measurement apparatus (the noise which is generated in the light receiving element 12:noise measuring step), before measuring the light SG1 to be measured. On measuring the noise, a laser light source is used which irradiates a continuous light.

It is desired that a semiconductive laser is used as the laser light source whose irradiated light has a known wavelength and which is capable of varying the light intensity of the irradiated light.

Incidentally, a light variable attenuator may attenuate the laser light irradiated from the laser light source, to vary the light intensity, without directly varying the light intensity of the laser light irradiated from the laser light source.

On measuring the noise generated in the light receiving element 12, the laser light irradiated from the laser light source is inputted as the light SG1 to be measured, to the optical wave multiplexer 10. Furthermore, the sampling light is inputted to the optical wave multiplexer 10. The nonlinear optical element 11 produces the sum frequency light SG3. The sum frequency light SG3 is received by the light receiving element 12 to be converted into the photoelectric current. The photoelectric current is converted into the digital signal by the A/D converter 13 and the digital signal is inputted to the operating unit 17. The operating unit 17 calculates the variance (noise) in accordance with the inputted digital signal to memorize the variance in correspondence to the light intensity of the laser light, in the storage unit 15.

The above-mentioned operation is sequentially carried out with varying the light intensity of the laser light. In addition, a similar measurement is carried out at a state in which the laser light source stops irradiating the laser light. When the laser light source stops irradiating the laser light, the obtained noise corresponds to the noise $\sigma_3$ of the above-mentioned Equation (3). Incidentally, the noise based on the amount of light is used in case where the laser light is not perfectly at an off state in a level of logic "0". The above-mentioned noise measurement may be carried out with continuously varying the light intensities of the laser light. Alternatively, the above-mentioned noise measurement may be carried out with discretely varying unique light intensities of the laser light.

Next, description will made about operation in measurement of the light SG1 to be measured, after finishing to measure the noise generated in the light sampling measurement apparatus (the noise generated in the light receiving element 12). In the measurement of the light SG1 to be measured, the light SG1 to be measured is inputted to the optical wave multiplexer 10. Furthermore, the sampling light SG2 is inputted to the optical wave multiplexer 10, in order to produce the sum frequency light SG3 in the nonlinear optical element 11.

Figure 2:
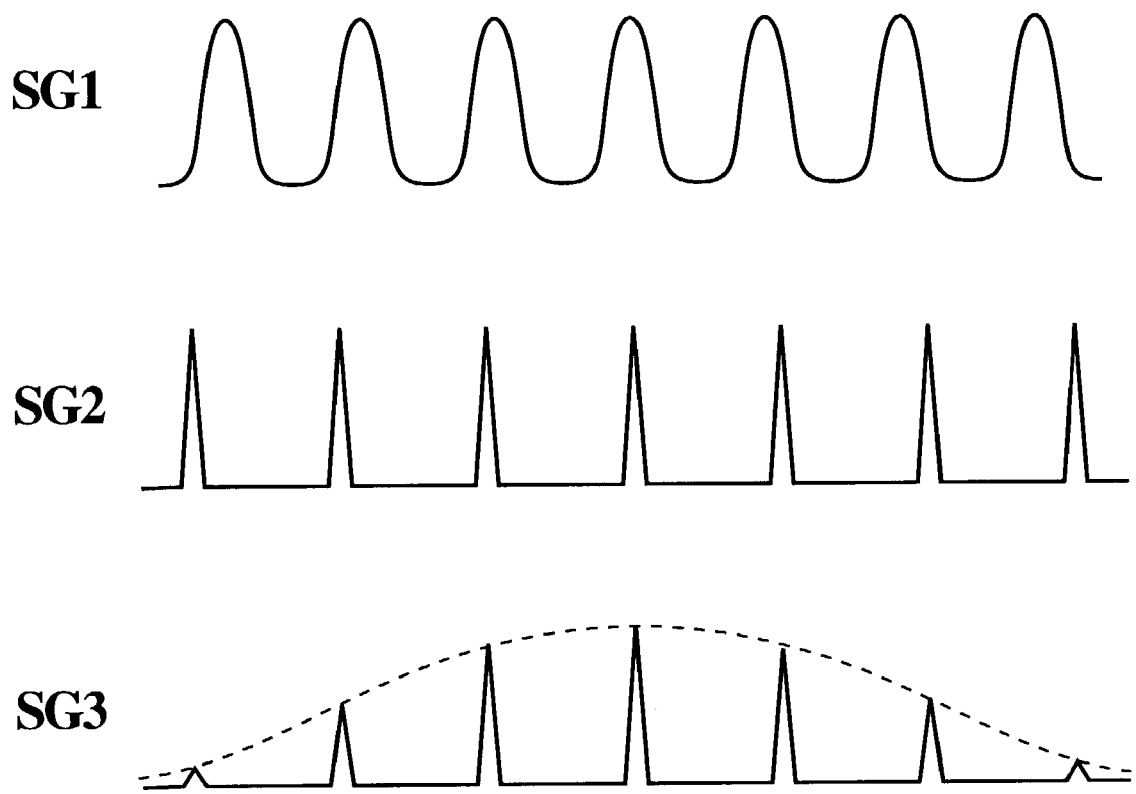
FIG. 2 shows examples of a light SG1 to be measured, a sampling light SG2, and a sum frequency light SG3.

FIG. 2 shows examples for illustrating the light SG1 to be measured, the sampling light SG2, and the sum frequency light SG3. In FIG. 2, the horizontal axis represents time and the vertical axis represents the light intensity (intensity: optional unit). When the light SG1 to be measured (light pulse) has frequency of $f_{sig}$, the frequency $f_{sam}$ of the sampling light (optical pulse) is set to, for example, $f_{sig}/n$-$\Delta f$, where n represents a frequency division ratio (natural number) and $\Delta f$ represents a variation frequency which is set by the user. Incidentally, FIG. 2 shows the examples in case of n=1 for the sake of simplicity.

As shown in FIG. 2, the sampling light SG2 has $\delta$ functional light pulses of narrow pulse width. When the light SG1 to be measured is multiplexed to the sampling light SG2 by the optical wave multiplexer 10 to be inputted to the nonlinear optical element 11, the nonlinear optical element 11 generates the sum frequency light SG3 only when both of the light SG1 to be measured and the sampling light SG2 exist. The light intensity of the sum frequency light SG3 is depend upon the light intensity of the light SG1 to be measured, inasmuch as the light intensity of the sampling light SG2 is constant. Inasmuch as the variation frequency $\Delta f$ is set between the light SG1 to be measured and the sampling light SG2, the envelope of the sum frequency light SG3 has a shape in which one light pulse of the light SG1 to be measured is enlarged in $f_{sig}/(n \cdot \Delta f)$ towards the time axis.

Figure 3:
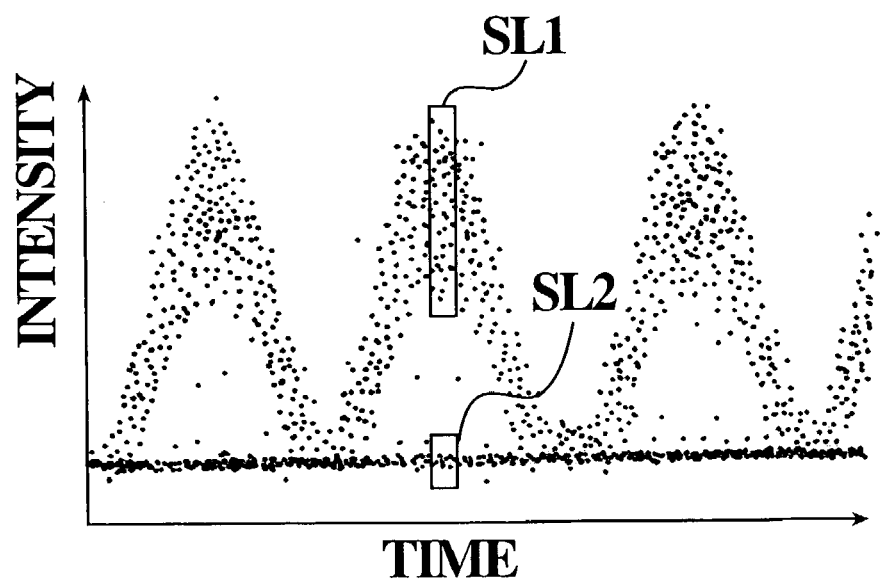
FIG. 3 shows an example of a waveform (eye-pattern) which is obtained by carrying out sampling of the light SG1 to be measured.

The sum frequency light SG3 is received by the light receiving element 12 to be converted into the photoelectric current. The photoelectric current outputted from the light receiving element 12 is converted into the digital signal by the A/D converter 13 to be inputted to the signal processing section 14. The operating unit 17 repeatedly sweeps the signal outputted from the A/D converter 13, to memorize data therein and calculates the waveform obtained by sampling the light SG1 to be measured. FIG. 3 shows an example for illustrating the waveform (eye-pattern) obtained by sampling the light SG1 to be measured. It is noted that variation occurs in the light intensity of the waveform obtained by sampling the light SG1 to be measured.

With respect to the above-mentioned waveform, the operating unit 17 compares a predetermined threshold level with data during a certain time duration (for example, several picoseconds) to separate data having the signal level "1" from the data having the signal level "0". Furthermore, the operating unit 17 calculates the averages $\mu_1$ and $\sigma_0$ and variances $\sigma_1$ and $\sigma_0$ with respect to data having the signal level "1" and data having signal level "0", respectively (measuring step). Incidentally, data included in a region of reference numeral SL1 have the signal level "1". Data included in a region of reference numeral SL2 have the signal level "0".

When the above-mentioned processing ends, the operating unit 17 reads the noise stored in the storage unit 15 in correspondence to the light intensity of the light SG1 to be measured, as the noise $\sigma_2$ and reads the noise $\sigma_3$ out of the storage unit 15. The operating unit 17 calculates the accurate Q value of the light SG1 to be measured, using the above-mentioned Equation (3) (calculating step). Incidentally, the operating unit 17 may calculate the accurate Q value by using the noise which is calculated by the calculating unit 16, instead of using the noise stored in the storage unit 15, in case where the storage unit 15 stores the discrete noise in correspondence to the discrete light intensity. The display unit 18 displays the Q value calculated by the operating unit 17 and the sampled waveform illustrated in FIG. 3.

Although description is made as regards the light sampling measurement apparatus and the light sampling measurement method according to the preferred embodiment of the present invention, it is possible to change the design within a range of the present invention, without limiting the present invention to the above-mentioned embodiment. In addition, it is desired that the storage unit 15 further stores all noises generated in the light sampling measurement apparatus, although description is made about the example in which the storage unit 15 stores the noise only generated in the light receiving element 12, in the above-mentioned embodiment, for the sake of simplicity. For example, the storage unit 15 further stores the noise generated in the amplifier which is located between the light receiving element 12 and the A/D converter 13. Furthermore, the storage unit 15 may store the noise which is set at each gain in the light receiving element 12.

As described above, the storage unit stores the noise generated in the light receiving element according to the present invention. On measuring the light to be measured, the noise is obtained by subtracting the light receiving element noise stored in the storage unit, from the measured noise, in order to calculate the Q value of the light to be measured. Accordingly, it is possible to accurately measure the Q value of the light to be measured, even though the inputted light of the light receiving element has the weak intensity on the basis of the nonlinear optical effect and the noise generated in the light receiving element wields the very large influence over the measurement of the light to be measured, inasmuch as the influence of the noise generated in the light receiving element is removed from the measured noise.

What is claimed is:

1. A light sampling measurement apparatus comprising a nonlinear optical element supplied with a light to be measured and a sampling light and a light receiving element for receiving a light outputted from the nonlinear optical element, comprising:

a storage unit for previously storing noise generated in the light receiving element; and a calculating unit for obtaining a subtracted noise by subtracting the noise stored in the storage unit, from a measured noise, to calculate a Q value of the light to be measured, wherein the storage unit stores the noise generated in the light receiving element at each light intensity of the light to be measured.

2. A light sampling measurement apparatus comprising a nonlinear optical element supplied with a light to be measured and a sampling light and a light receiving element for receiving a light outputted from the nonlinear optical element, comprising:

a storage unit for previously storing noise generated in the light receiving element; and a calculating unit for obtaining a subtracted noise by subtracting the noise stored in the storage unit, from a measured noise, to calculate a Q value of the light to be measured, wherein:

the storage unit stores the noise generated in the light receiving element at each specific light intensity and;

the light sampling measurement apparatus comprising an operating unit for calculating a noise to be subtracted on the basis of the light intensity of the light to be measured, using the noise stored in the storage unit.

3. A light sampling measurement apparatus comprising a nonlinear optical element supplied with a light to be measured and a sampling light and a light receiving element for receiving a light outputted from the nonlinear optical element, comprising:

a storage unit for previously storing noise generated in the light receiving element; and a calculating unit for obtaining a subtracted noise by subtracting the noise stored in the storage unit, from a measured noise, to calculate a Q value of the light to be measured, wherein the noise stored in the storage unit is obtained by inputting a continuous light having a known light intensity as the light to be measured, to the nonlinear optical element.

4. A light sampling measurement apparatus as claimed in claim 1, wherein the noise stored in the storage unit is obtained by inputting a continuous light having a known light intensity as the light to be measured, to the nonlinear optical element.

5. A light sampling measurement apparatus as claimed in claim 2, wherein the noise stored in the storage unit is obtained by inputting a continuous light having a known light intensity as the light to be measured, to the nonlinear optical element.

* * * * *